Figure 1:
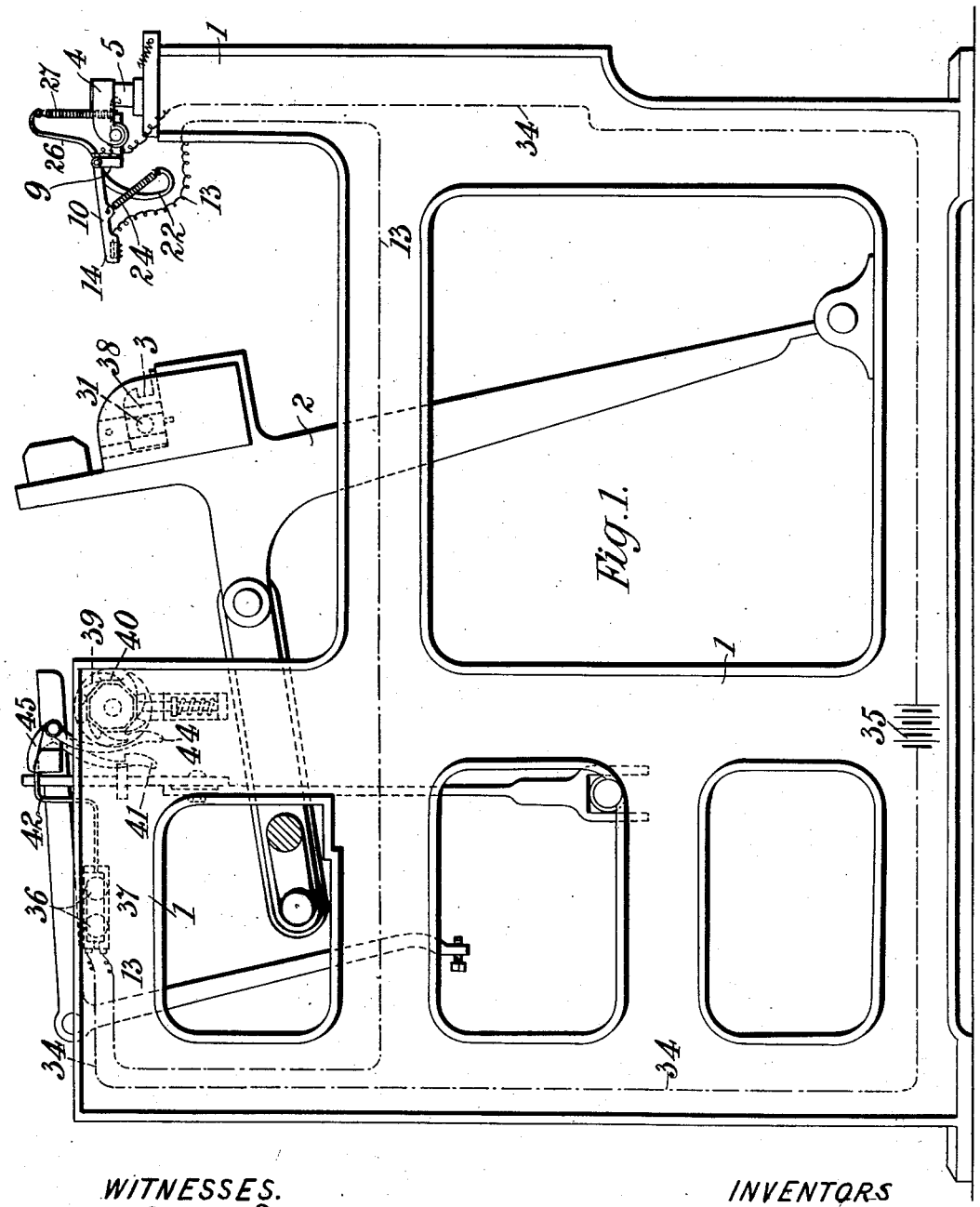

No. 874,550. PATENTED DEC. 24, 1907.
A. E., A. & G. WALKER.
CONTROLLING DEVICE FOR AUTOMATIC WEFT REPLENISHING LOOMS.
APPLICATION FILED OCT. 16, 1905.

5 SHEETS—SHEET 1.

WITNESSES.
W. Max. Duvall
E. M. Brandt.

INVENTORS
A. E. Walker
Arthur Walker &
George Walker, by
Wilkinson & Fisher, Attys No. 874,550. PATENTED DEC. 24, 1907.
A. E., A. & G. WALKER.
CONTROLLING DEVICE FOR AUTOMATIC WEFT REPLENISHING LOOMS.
APPLICATION FILED OCT. 16, 1905.

5 SHEETS—SHEET 2.

WITNESSES.
W. Max. Duvall.
E. M. Brandt

INVENTORS.
A. E. Walker,
Arthur Walker &
George Walker,
by Wilkinson & Fisher, Attys.

No. 874,550. PATENTED DEC. 24, 1907.
A. E., A. & G. WALKER.
CONTROLLING DEVICE FOR AUTOMATIC WEFT REPLENISHING LOOMS.
APPLICATION FILED OCT. 16, 1905.

5 SHEETS—SHEET 4.

WITNESSES.
W. Mart. Duvall.
E. M. Brandt.

INVENTORS,
A. E. Walker,
Arthur Walker &
George Walker,
by Wilkinson & Fisher,
Attys.

No. 874,550. PATENTED DEC. 24, 1907.
A. E., A. & G. WALKER.
CONTROLLING DEVICE FOR AUTOMATIC WEFT REPLENISHING LOOMS.
APPLICATION FILED OCT. 16, 1905.

5 SHEETS—SHEET 5.

WITNESSES.
W. Mal. Duvall.
E. M. Brandt.

INVENTORS,
A. E. Walker
Arthur Walker,
George Walker,
by Wilkinson & Fisher
Attys.

UNITED STATES PATENT OFFICE.

ALBERT EDWARD WALKER, ARTHUR WALKER, AND GEORGE WALKER, OF NORWOOD GREEN, NEAR HALIFAX, ENGLAND.

CONTROLLING DEVICE FOR AUTOMATIC WEFT-REPLENISHING LOOMS.

No. 874,550.	Specification of Letters Patent.	Patented Dec. 24, 1907.

Application filed October 16, 1905. Serial No. 283,025.

*To all whom it may concern:*

Be it known that we, ALBERT EDWARD WALKER, ARTHUR WALKER, and GEORGE WALKER, subjects of the King of Great Britain, residing at Norwood Green, near Halifax, England, have invented a certain new and useful Improvement in Controlling Devices for Automatic Weft - Replenishing Looms, of which the following is a specification.

The invention relates to controlling devices, that is, weft-detecting devices, for automatic looms operated electrically upon the absence of yarn at a particular point on the weft bobbin whereby the weft-replenishing mechanism can be put into operation; and has reference to means employed for enabling such devices to operate immediately the determined point upon the bobbin is clear of yarn irrespective of variations occurring in the position of the bobbin with regard to the position of the weft-detector.

The invention is carried into effect by arranging the detecting device—which may be brought into contact with the bobbin in the shuttle somewhat in the manner described in the specification to our United States Patent No. 796,882—in the circuit of an electric current from a suitable generator so that said circuit is completed by the contact of the detecting device with the bobbin when the latter is nearly empty of yarn, and also by arranging in the circuit an electromagnetic device through which the current passes when the circuit is completed which device is thereby caused through any suitable intermediate mechanism to operate the weft-replenishing mechanism of the loom.

Figure 2:
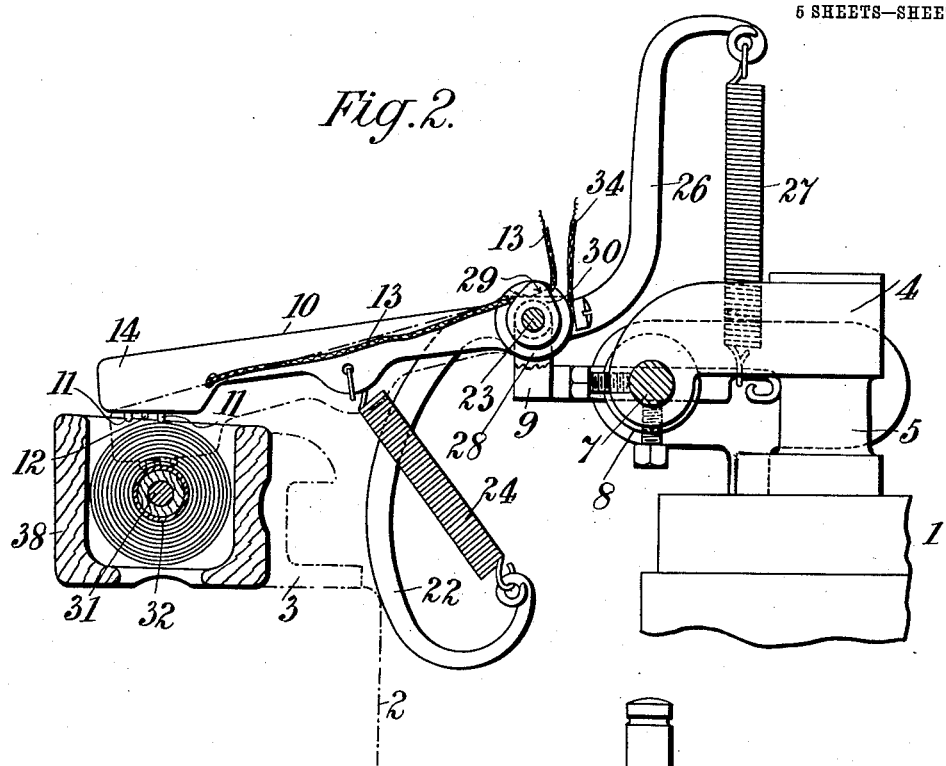
Figure 3:
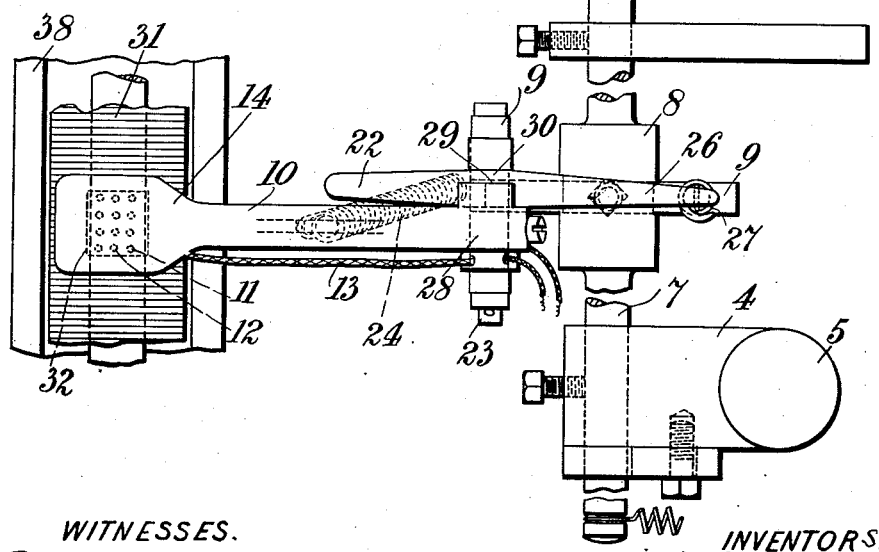
Figure 4:
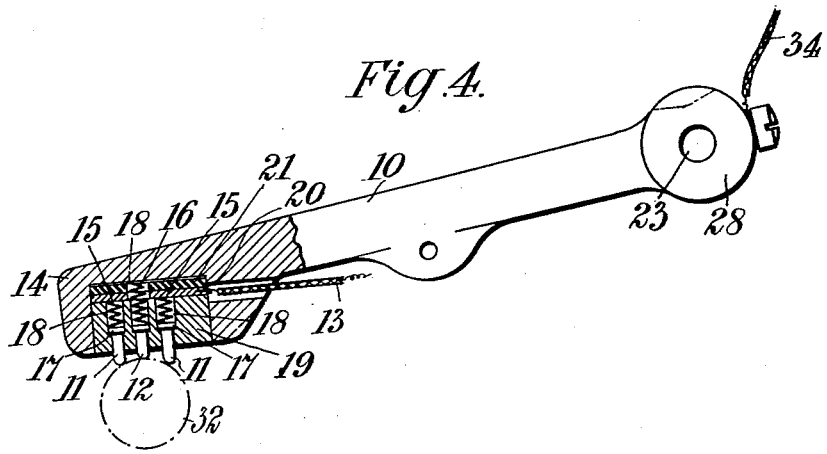
Figure 5:
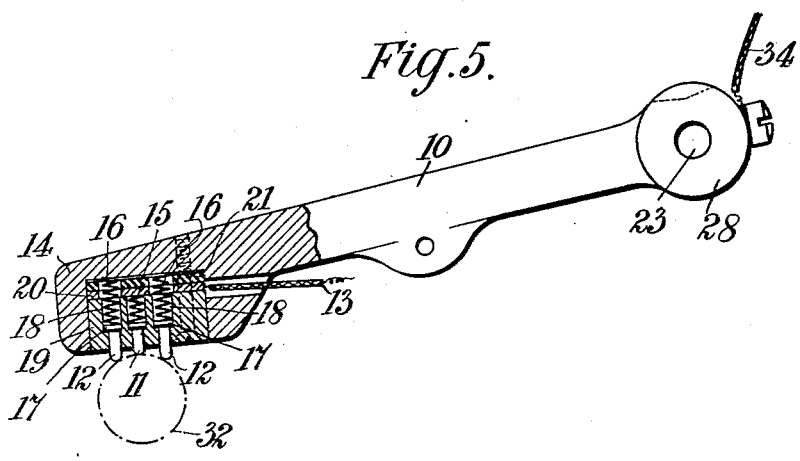
Figure 6:
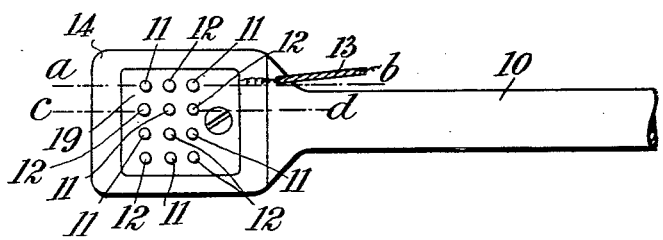
Figure 7:
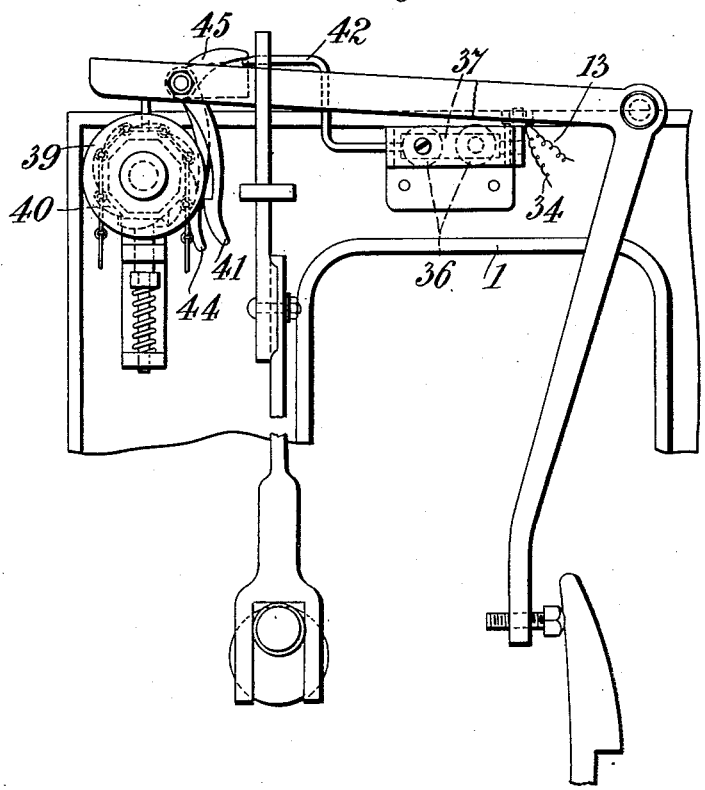
Figure 8:
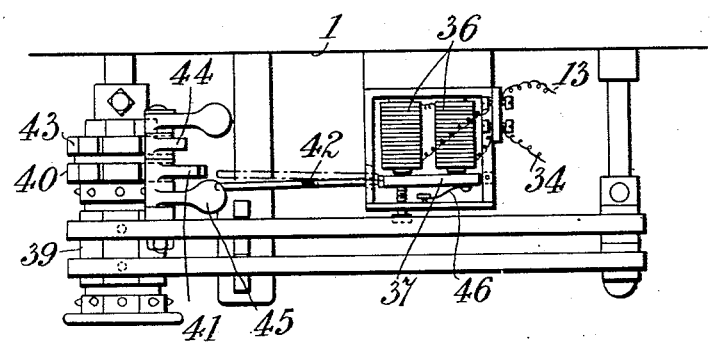
Figure 9:
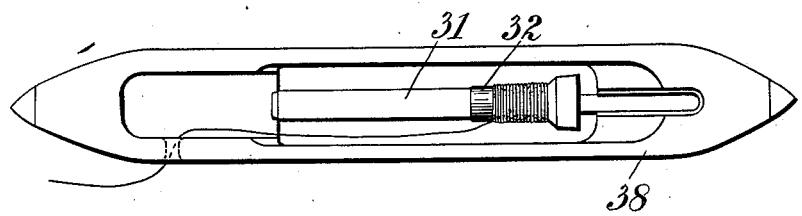
Figure 10:
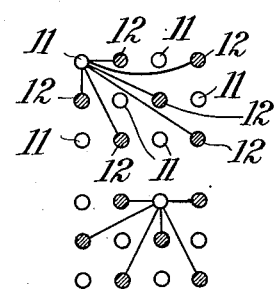
Figure 10:
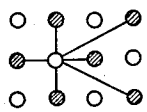
Figure 10:
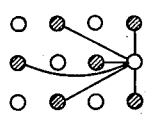
Figure 10:
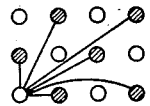
Figure 10:
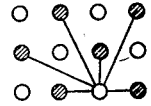

In the accompanying drawings:—Figure 1 illustrates in side elevation on a general arrangement of the parts the application of our invention to controlling and operating mechanism of the character described in the above mentioned specification. Fig. 2 is a side elevation partly in section on an enlarged scale of the detecting device and part of the shuttle. Fig. 3 is a plan of Fig. 2. Fig. 4 is a sectional view of the foot of the detector on line *a—b* of Fig. 6. Fig. 5 is a similar view on line *c—d* of Fig. 6. Fig. 6 is an under plan of the detector foot. Fig. 7 is a side elevation partly in section on a larger scale than Fig. 1 of the application of our invention to operating mechanism of the character described in the specification to our United States Patent No. 796,950. Fig. 8 is a plan of Fig. 7. Fig. 9 is a plan of a shuttle with bobbin—and Fig. 10 is a diagram illustrating a number of combinations of action where six pairs of terminals are used.

The detecting device comprises the usual short arm 4 rotatably carried on a stud 5 fixed in any convenient position, such as on the front of the loom frame 1 opposite to the shuttle-box 3, and adjustably holding the swinging-rod 7 which in the present case swings only for the purpose of enabling it to yield if the feeling finger meets an obstruction. To the enlarged part 8 of the rod 7 is attached the bracket 9 which carries the feeler or detector finger 10, the novel construction of which constitutes the principal part of the invention.

The detector finger 10 carries, as shown more clearly in Figs. 3, 4, 5 and 6, the positive and negative terminals 12, 11, of wires or leads 34, 13 from and to a suitable generator. These terminals are subdivided to any required extent. The terminals are carried in the foot 14 of said finger and are arranged alternately positive and negative as shown, and are mounted preferably on springs 15, 16, so that each terminal is capable of separate movement, thus giving a multiplicity of movable feeling points to the detector finger. In the construction shown the finger 10 itself acts as the conductor from lead 34 to one set of terminals 12, while a plate 20 acts as the conductor to lead 13 from the other set 11. The terminals carry stop pieces 17 which rest against shoulders formed in the recesses 18 in the part 19 which carries them, and said terminals are preferably of different lengths in order that they may normally conform to the contour of the bobbin.

Interposed between the inner faces of the part 19 and the foot 14 are two plates, 20, 21, (Figs. 4 and 5) of conducting and non-conducting materials respectively. Both plates are perforated for the passage of the springs 16 of one set 12 of terminals, while the springs 15 of the other set 11 abut against the conducting plate 20. The current passes from lead 34 through the finger 10 itself to the springs 16, and from the springs 15 through plate 20 to lead 13.

The detector finger 10 is brought in contact with the bobbin after the manner described in the specification referred to (or by straight contact with the bobbin if so desired) on the close of the forward movement of the going-part 2, which causes it to strike a depending finger 22 pivoted to a pin or the like 23 carried by the bracket 9 and which carries the detector finger 10. The depending finger 22 is connected to the detector finger 10 by a spring 24, and has an extension 26 on the other side of the pin 23 which is connected by spring 27 with part of the rod 7 such as to the hooked projection on bracket-piece 9.

The detector finger 10 is provided with a boss 28 through which the pin 23 passes, which boss is partly undercut at 29 to form two angular faces, which are alternately adapted to rest upon a flat face 30 formed at the junction of the depending finger 22 and its extension 26, whereby the detector finger can yield with a movement which is limited by the faces which form shoulders or stops when the depending finger 22 brings the detector foot 14 in contact with the yarn on the bobbin.

The bobbin 31, Figs. 2 and 9, is fitted with a metal hoop or part, such as a copper band 32, see also Fig. 3, or some other suitable conducting part, at the point of contact of the detector finger to act as a contact-piece and complete the circuit, which remains interrupted by the yarn on the bobbin 31 until said yarn is drawn off to expose the piece 32 when the foot 14 of the detector finger is brought against it and the circuit thereby completed through the terminals 11, 12. Owing to the number of contact points it will be seen that at the moment when the contact-piece on the bobbin is exposed the shuttle 38 may either go beyond or fall short of its usual position in the shuttle-box and yet the circuit will be completed and the shuttle be discharged at the proper time with a regular and minimum amount of yarn left upon the bobbin, for the reason that under whichever pair of terminals the exposed contact-piece comes to rest, the circuit is completed.

For example, if three pairs of terminals are employed and disposed in a single row parallel to the bobbin, should the shuttle come to rest in its usual position the middle pair will fall upon the contact-piece 32 while the outer pair will fall ineffectively upon the nonconductive part of the bobbin and the inner pair upon the yarn remaining on the bobbin and be elevated by it without disturbing the lower position of the other pairs, since the yielding movement of each terminal is independent of the others.

In the device herein described six pairs of terminals are employed and disposed in three rows as shown in the diagram (Fig. 10) which illustrates the thirty-six different combinations of operative pairs which may be occasioned by the varying position of the bobbin relatively to the detector-finger, or by the presence of a non-conductive substance between some of the contacting points, for example, the thread of yarn itself as it is being drawn longitudinally off the bobbin. The lead 34 from the one set of terminals 12 passes to the generator, which may take the form of a battery 35 (Fig. 1) conveniently arranged on or adjacent to the loom, and thence to an electro-magnet 36, Figs. 1, 7 and 8, attached to the frame 1. The other lead 13 from the set of terminals 11 passes direct to said electro-magnet, so that upon the circuit being completed, a movement of the armature 37 results, which movement is utilized through intermediate mechanism to put into operation the weft-replenishing mechanism.

Any suitable intermediate mechanism may be employed to receive the movement of the armature 37, and in Figs. 1, 7 and 8 is shown a convenient and preferable form, such as that described in our United States specification No. 796950, referred to, which comprises a cylinder 39 carrying perforated cards operated by two ratchets and pawls— a perfect ratchet 40 having its pawl 41 normally held out of action by a movable rod 42 and an imperfect ratchet 43 having its pawl 44 normally passing inactive over the space of the missing tooth. In the present case however a movable rod 42 which puts the pawl 41 of the perfect ratchet 40— the starting ratchet of the cylinder—into and out of action is attached to the armature 37 of the magnet. This rod rests normally under the weighted projection 45 of the pawl 41 keeping it out of action with the ratchet. When the armature is attracted to the magnet the rod is moved aside and the support of the pawl 41 being withdrawn, the latter falls upon the ratchet 40 and puts the cylinder in motion. The rotation of the cylinder is then taken up by the imperfect ratchet 43 and continued until the space of the missing tooth again arrives under the pawl 44. The usual spring 46 on the armature 37 returns the rod to its position under the weighted projection of the pawl 41 when the latter rises.

What we claim is:—

1. In automatic weft-replenishing looms, and in combination, a controlling device comprising a feeling finger, a separate part carried thereby and having recesses therein, a number of independently movable positive and negative electric terminals arranged alternately and located partly within said recesses, springs within said recesses for controlling the movement of said terminals, stop pieces also within the recesses for limiting said movement, electric connections between said terminals and a source of electric supply, a bobbin having a conductive part thereon with which said terminals are adapted to contact to complete the circuit, weft-replenishing mechanism, and means operable on the completion of said cicuit for actuating said weft-replenishing mechanism.

2. In automatic weft-replenishing looms and in combination a movable feeling finger, a number of movable feeling points carried thereby to form the terminals of an electric circuit, a source of electric supply, electric connections between the latter and the terminals, a bobbin, a conductive part thereon with which said terminals are adapted to contact to complete the circuit, means for moving said finger to bring said terminals into contact with the bobbin, means comprising springs and a boss on the feeling finger having undercut angular faces thereon adapted to contact with a face on a depending part for controlling the movement of the finger, weft-replenishing mechanism and means operated by the completion of the circuit for actuating said weft-replenishing mechanism.

In testimony whereof we have hereunto set our hands in the presence of two subscribing witnesses.

ALBERT EDWARD WALKER.
ARTHUR WALKER.
GEORGE WALKER.

Witnesses:
 FRED HAMMOND,
 W. H. KENNARD.